March 13, 1962   H. H. MERRIMAN   3,024,647
TESTING APPARATUS FOR ANCHORS
Filed Oct. 27, 1958
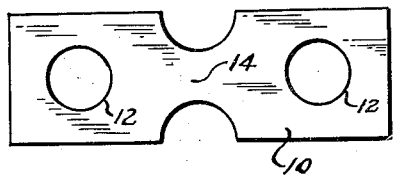
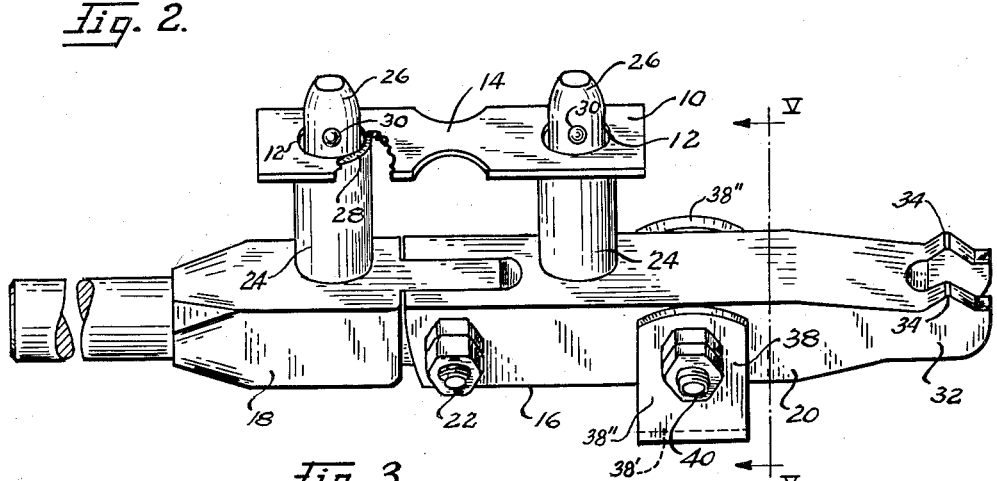
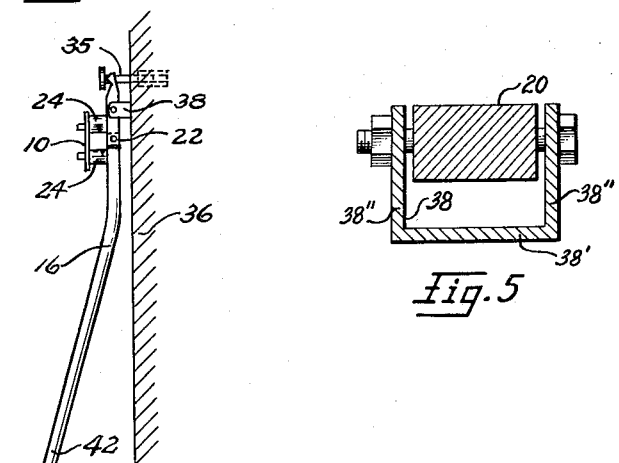
INVENTOR
HENRY H. MERRIMAN
BY Beaman & Beaman
ATTORNEY

United States Patent Office 3,024,647
Patented Mar. 13, 1962

3,024,647
TESTING APPARATUS FOR ANCHORS
Henry H. Merriman, 751 N. Washington St., Jackson, Mich.
Filed Oct. 27, 1958, Ser. No. 769,771
4 Claims. (Cl. 73—141)

The present invention relates to improvements in apparatus for testing the factor of safety of anchorages, tension members, supports and the like; the invention being particularly concerned with apparatus for testing hooks and supports to which safety belts are attached.

It is common structural practice in commercial building to anchor hooks and supports in the masonry adjacent the windows for the attachment of safety belts of workmen engaged in the washing, painting and maintenance of the windows from the outside of the building. Over a period of time the anchorage of such hooks and supports in the masonry deteriorates, as does the structural strength of the hooks and supports. Up to the present time no practical apparatus has been placed upon the market for periodically testing such hooks and supports to determine their factor of safety.

According to the present invention a member capable of effecting a mechanical advantage, such as a lever, is provided for manually exerting a force upon the device to be tested. Associated with the lever member, as a structural part thereof, is a renewable, destructible link of known strength which, in the use of the lever member in testing, is ruptured provided the device being tested offers sufficient resistance to movement by forces exerted by the lever. The resistance of the link may be acting in either tension or shear. Preferably, the member for exerting the mechanical advantage is so constructed that with the passage of time the resistance of the parts thereof to relative movement does not appreciably change. For example, if a hinge connection is used it should be a relatively loose connection to avoid any possibility of developing a bind which would reduce the forces acting upon the test link. If this is not taken into consideration, the uniform performance of the test link design of the present invention will not be fully realized.

Thus, an object of the invention is to provide an improved testing apparatus of the type described which may be dependably employed by inexperienced persons and retain its accuracy regardless of its frequency of use.

Another object is to provide a testing apparatus for window safety belt hooks and supports which may be conveniently employed from within the building without endangering the person testing or persons passing the building.

Another object of the invention is to provide an improved testing apparatus in which a replaceable, destructible link is employed to transmit the exerted forces of the testing and to control the maximum forces exerted upon the device being tested.

A further object resides in the provision of an improved testing link which will give relatively uniform test results under substantially all conditions in the hands of unskilled persons.

These and other objects and advantages residing in the combination, construction and arrangement of component parts will more fully appear from the following specification and claims.

In the drawings,
FIG. 1 is a plan view of the preferred form of the test link,
FIG. 2 is an end elevation of FIG. 1,
FIG. 3 is an angle view of the testing apparatus with the test link applied,
FIG. 4 shows the apparatus testing a safety belt support in a masonry window frame, and FIG. 5 is a cross-sectional view taken on line V—V of FIG. 3.

In the illustrated form of the invention the test link 10 is stamped from strip of aluminum of uniform thickness and structural characteristics. Holes 12 are provided at opposite ends of the link to provide convenient attachment. In any suitable manner a narrow neck of metal is provided at 14 to provide the minimum cross sectional area at this point in order to localize failure in tension of the link 10.

The testing apparatus comprises, in addition to the link 10, a lever member 16 having parts 18 and 20 with tongue and slot opposed ends hinged upon a suitable bolt 22. Each part 18 and 20 has a rigid post 24 having an outer end 26 of reduced diameter to provide a shoulder 28. With the parts 18 and 20 axially aligned the link 10 may be inserted over the ends 26 to rest upon the shoulder 28. Depressible spring pressed balls 30 in the posts 26 are forced inwardly at the time the link 10 is inserted in position to rest upon the shoulder 28 and return to their normal outward position to latch the link 10.

The part 20 has an outer end portion of any desired shape to facilitate engagement with the device to be tested. As shown, the outer end is forked at 32 with spaced lobes 34 to engage the underside of a support 35, for example, anchored in the masonry of window frame 36. Between the bolt 22 and end 32 a fulcrum portion 38 is provided in the form of a bolt 40 extending through the part 20 and having a pivotal connection with a U-shaped member having a portion 38' extending beneath with substantial clearance and parallel portions 38" extending along opposite sides of the part 20.

As shown in FIG. 4, the part 18 has a handle extension 42. To test the anchorage of the support 35 in the masonry frame 36, a test link 10 is attached across the posts 24 to restrain the free pivotal association between the parts 18 and 20 about the axis of the bolt 22. With the fulcrum 38 resting against the frame 36 and the part 20 freely pivoted on the bolt 40 movement on the handle 42 toward the frame 36 will cause an outward force to be exerted upon the under side of the support 35 located with the forked end 32 through the lobes 34. Under the conditions just described it will be appreciated that the forces which are developed by the handle 16 and directed with mechanical advance about the fulcrum 38 to the support 35 are all transmitted through the link 10. By selecting a link 10 of known structural strength in tension, failure of the link 10 at 14 will determine the support 35 as having a factor of safety against removal upon axial pull of a known value. Upon failure in tension of the link 10, the balls 30 will prevent the separated parts of the link 10 from flying off into space. These parts are thereafter removed by depressing the balls 30 and a new link 10 applied to the posts 24 in readiness for testing another support 35.

The link 10 should be fabricated from material which will retain its original structural properties in storage over all periods of time. In practice, the safety belt supports used by window cleaners would normally be tested only once a year. Such practice will result in a building operator purchasing a supply of links 10 for testing the window safety belt supports which may not be consumed over a period of several years although necessarily two links 10 will be consumed in checking the supports of each window of the building above the first floor.

In addition to aluminum from which to fabricate the links 10, numerous other corrosive resisting materials will readily suggest themselves such as bronze, brass, stainless steel, metals with protective coating, plastics, fibre and the like.

It is anticipated that a disclosure of the basic principles of the present invention will suggest to those skilled in the art many other arrangements for restraining movements of the parts 18 and 20 around the bolt 22 by a suitable test element. For example, in lieu of placing the test element under tension as in the case of the link 10, failure of the test element in shear or compression may be readily employed.

Having thus described my invention what I claim is novel and wish to protect by Letters Patent is:

1. A testing apparatus comprising a member for manually exerting a force with mechanical advantage upon a device to be tested, said member having relatively moveable parts and a first portion for exerting a force upon the device to be tested, a second portion upon said member to take the reaction of the force exerted upon the device to be tested, said member having support means for a test link, mounted upon said relatively moveable parts of said member, a replaceable, destructible test link upon said support means of known resistance to destruction upon relative movement of said parts, said link being a structural element of said member through which manual force with mechanical advantage is transmitted to said first portion and restraining said relatively moveable parts against relative movement within the structural strength of said link.

2. A testing apparatus as defined in claim 1 wherein said member is a lever, said relatively moveable parts have means for hingedly connecting the same, and said support means are on opposite sides of the hinged connection between said parts.

3. A testing apparatus as defined in claim 1 wherein said member is a lever, said parts having a hinge connection with each other, said mounting means being in the form of spaced posts upon said parts upon opposite sides of said hinge connection, and said test link being a tensile member having holes defined in opposite ends and received over said posts to restrain said hinge connection.

4. A testing apparatus as defined in claim 1 wherein said member is a lever, said second portion being a fulcrum, said first and second portions being located upon the same one of said parts, a hinge connection between said parts, said mounting means engaging said test link across said hinge connection and restraining said parts against hinging movement.

References Cited in the file of this patent

UNITED STATES PATENTS

| | | |
|---|---|---|
| 2,494,571 | Milburn | Jan. 17, 1950 |
| 2,520,786 | Scott | Aug. 29, 1950 |
| 2,759,357 | Bos et al. | Aug. 21, 1956 |
| 2,835,128 | Herrstrum | May 20, 1958 |
| 2,917,920 | Robinette et al. | Dec. 22, 1959 |